United States Patent
Lancaster, III et al.

(10) Patent No.: US 7,540,128 B2
(45) Date of Patent: Jun. 2, 2009

(54) FILM DISPENSER WITH PRE-STRETCH ASSEMBLY

(75) Inventors: Patrick R. Lancaster, III, Louisville, KY (US); Richard L. Johnson, LaGrange, KY (US); Willie Martin Hall, Taylorsville, KY (US); Jeremy D. Anderson, Cox's Creek, KY (US); David Eldridge, Fern Creek, KY (US)

(73) Assignee: Lantech.com, LLC, Louisville, KY (US)

( * ) Notice: Subject to any disclaimer, the term of this patent is extended or adjusted under 35 U.S.C. 154(b) by 89 days.

(21) Appl. No.: 11/371,254

(22) Filed: Mar. 9, 2006

(65) Prior Publication Data

US 2006/0254225 A1 Nov. 16, 2006

Related U.S. Application Data (60) Provisional application No. 60/659,886, filed on Mar. 10, 2005.

(51) Int. Cl.
*B65B 53/00* (2006.01)
(52) U.S. Cl. ............... 53/556; 53/436; 53/441
(58) Field of Classification Search ............... 53/436, 53/441, 556; 242/419.6, 419.8, 419.9
See application file for complete search history.

(56) References Cited

U.S. PATENT DOCUMENTS

| | | | | |
|---|---|---|---|---|
| 4,747,254 A | * | 5/1988 | Lancaster | 53/556 |
| 4,953,336 A | * | 9/1990 | Lancaster et al. | 53/556 |
| 6,082,081 A | * | 7/2000 | Mucha | 53/556 |
| 6,102,313 A | * | 8/2000 | Salzsauler et al. | 242/160.4 |
| 6,311,459 B1 | | 11/2001 | Rossi | |
| 6,698,161 B1 | | 3/2004 | Rossi | |
| 6,772,573 B2 | * | 8/2004 | Federeszyn | 53/389.2 |
| 7,178,317 B1 | * | 2/2007 | Koskela | 53/587 |
| 2003/0066269 A1 | | 4/2003 | Federeszyn | |

FOREIGN PATENT DOCUMENTS

| | | |
|---|---|---|
| DE | 197 40 297 A1 | 3/1999 |
| GB | 2 395 165 A | 5/2004 |
| WO | WO 92/06893 A | 4/1992 |

OTHER PUBLICATIONS

International Search Report in International Application No. PCT/US2006/008507, mailed on Jun. 23, 2006.

* cited by examiner

*Primary Examiner*—Hemant M Desai
(74) *Attorney, Agent, or Firm*—Finnegan, Henderson, Farabow, Garrett & Dunner LLP (57) ABSTRACT

A film dispenser for a stretch wrapping apparatus is provided. The film dispenser includes a pre-stretch assembly having a top portion mounted to and extending downwardly from a drive plate of a roll carriage frame. The pre-stretch assembly includes two pre-stretch rollers having first ends connected to the roll carriage frame and second ends connected to one another. The pre-stretch rollers may be coated. The pre-stretch assembly further includes a cantilevered idle roller mounted to the drive plate and positioned between the pre-stretch rollers. A film path is defined by the space between the pre-stretch rollers and the idle roller. The film path is easily accessible via the bottom end of the pre-stretch assembly.

24 Claims, 11 Drawing Sheets

FILM DISPENSER WITH PRE-STRETCH ASSEMBLY

This application claims priority under 35 U.S.C. § 119 based on U.S. Provisional Application No. 60/659,886, filed Mar. 10, 2005, the complete disclosure of which is incorporated herein by reference.

FIELD OF THE INVENTION

The present invention relates to stretching wrapping apparatus having a film dispenser with a cantilevered pre-stretch assembly.

BACKGROUND OF THE INVENTION

Various packaging techniques have been used to build a load of unit products and subsequently wrap them for transportation, storage, containment and stabilization, protection and waterproofing. Products may be stacked as a load on a pallet to simplify handling of the products. The load is commonly wrapped with stretch wrap packaging material. One system uses stretch wrapping machines to stretch, dispense and wrap stretch packaging material around a load. Stretch wrapping can be performed as an inline, automated packaging technique that dispenses and wraps packaging material in a stretch condition around a load to cover and contain the load. Stretch wrapping, whether accomplished by a turntable, rotating arm, or vertical rotating ring, typically covers the four vertical sides of the load with a stretchable film such as polyethylene film. In each of these arrangements, relative rotation is provided between the load and the packaging material dispenser to wrap packaging material about the sides of the load.

Such a stretch wrapping apparatus performs admirably in accomplishing its intended goal of wrapping a load with a stretched web of film. However, the procedure of threading the film web through the series of rollers in the film web dispenser prior to operation of the stretch wrapping apparatus has been found to be time consuming and difficult. Conventional stretch wrapping apparatuses employ a film web dispenser having two closely spaced rollers to stretch between them a web of thermoplastic stretch film packaging material.

It is preferable that a stretch wrapping apparatus with pre-stretch rollers have the following features. The upstream and downstream pre-stretch rollers should be closely spaced during operation to prevent neckdown of the film web as it is being substantially stretched in the dispensing direction. Since the forces exerted on a wide web of stretch film between the pre-stretch rollers is very significant, in the order of 50 pounds of force, the frame and the mounting of the pre-stretch rollers should be required to be very sturdy. The surface of the pre-stretch rollers should be covered by the stretch film over a sufficient extent such that the stretch film does not slip on the pre-stretch rollers. The rotational inertia of the pre-stretch rollers should not be so high as to require excessively high power to vary their velocity. To accommodate these requirements, a series of idler rollers are used to support the stretch film proximate to the pre-stretch rollers and maintain the tack side of the film web facing the pre-stretch rollers. As a result, the film web follows a tortuous path around the closely spaced pre-stretch and idler rollers. The downstream pre-stretch roller has a faster surface speed than the upstream pre-stretch roller. This stretches the packaging material between the upstream and downstream pre-stretch rollers in the dispensing direction.

The increased numbers of rollers in the film dispensers for pre-stretch and the close spacing of such rollers with their effective interconnection for pre-stretching the film web prior to dispensing the film web on the load makes it very difficult to thread the film web through the pre-stretch portion of the film dispenser. Before operating a stretch wrapping apparatus having pre-stretch rollers, it is necessary to thread the stretch film along the tortuous path. This threading operation is difficult and time consuming since, due to the close spacing of the rollers, an operator cannot manually carry the stretch wrap packaging material between the rollers. Rather, the operator must feed the stretch wrap packaging material from one side of each roller nip with one hand and pull the stretch film from the other side of the roller nip with the other hand. This procedure is rendered considerably more difficult because of the large widths of the stretch wrap packaging material which are used commercially. Such webs generally have a width in the range of 10 to 30 inches. Other problems in threading resulted from the fact that the operator was required to place his fingers proximate to the nip of the rollers and blindly feed the film from the rear of the frame which carried the rollers, which made the threading operation difficult and more time consuming.

This threading problem was addressed in U.S. Pat. No. 4,747,254, the entire disclosure of which is incorporated herein by reference. This earlier arrangement reduced the difficulty of threading a web along a tortuous path by using a retractable leader which ran generally parallel to the path of the film web around the rollers to lead the film along the path. However, this arrangement required the leading end of the film web to be attached to the leader and the leader to be slowly pulled through the tortuous path while rotating the pre-stretch rollers, releasing the film web from the leader and retracting the leader.

Pre-stretch roll carriages include at least two coated pre-stretch rollers and additional rollers which are necessary for achieving the necessary film path. The pre-stretch rollers are mounted on shafts through bearings on each end. One end has a sprocket or pulley for connecting the rollers to each other and to the drive motor. The guiding rollers are also supported at both ends. Many prior art pre-stretch roll carriages "split" either vertically or horizontally to facilitate film threading around these multiple rollers. Examples of such prior art can be seen in numerous issued patents. Virtually all prior art pre-stretch roll carriages utilize a "W" threading pattern around the pre-stretch rollers which rotate in the same direction.

Figure 1A:
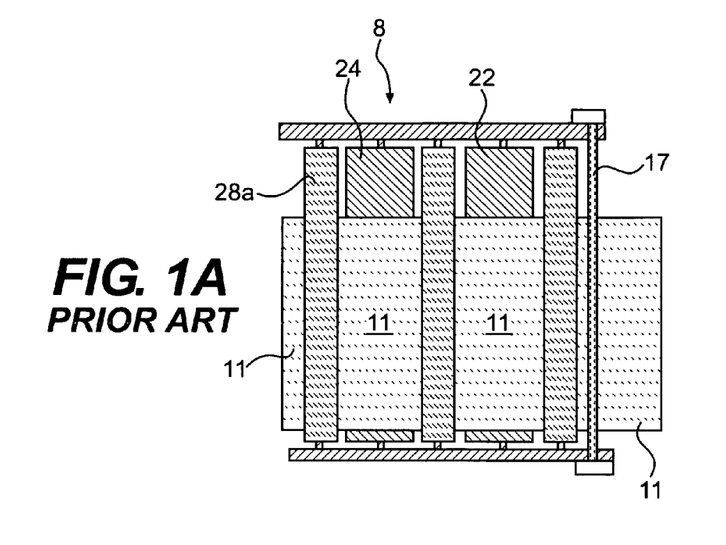
FIG. 1A is a front view of a conventional roll carriage frame and conventional pre-stretch assembly of a conventional packaging material dispenser in a closed position.
Figure 1B:
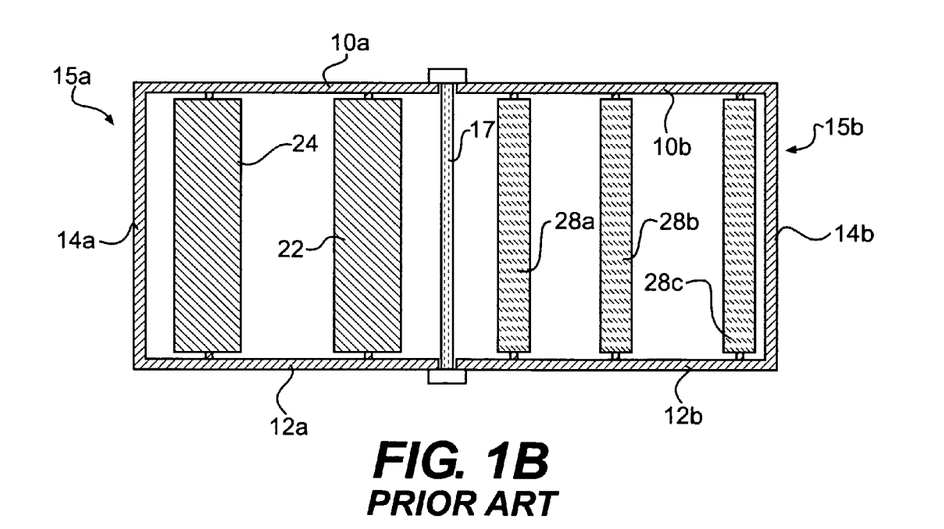
FIG. 1B is a front view of the conventional roll carriage frame and conventional pre-stretch assembly of the conventional packaging material dispenser of FIG. 1A in an opened position.

FIGS. 1A and 1B show a conventional pre-stretch roll carriage in the closed position and open position, respectively. As shown, a roll carriage frame 8 includes first and second upper frame portions 10a, 10b, first and second lower frame portions 12a, 12b, and first and second side frame portions 14a, 14b. The first frame portions 10a, 12a, 14a form a first side of the frame 15a and the second frame portions 10b, 12b, 14b form a second side of the frame 15b. The first and second sides of the frame 15a, 15b are pivotable relative to one another around a hinge 17. This "split frame" is necessary to permit threading of the film between the first and second sides of the frames and the rollers supported therein.

The roll carriage 8 supports two pre-stretch rollers 22, 24. The pre-stretch rollers 22, 24 are mounted on shafts and supported by first upper frame portion 10a and first lower frame portion 12a. The roll carriage 8 also supports idle rollers 28a, 28b, 28c. Each idle roller is supported by second upper frame portion 10b and second lower frame portion 12b. To thread the roll carriage 8, the film 11 is pulled between hinge 17 and over pre-stretch rollers 22, 24 while the roll carriage is in the open position. When the roll carriage is then closed, the film 11 is positioned between the pre-stretch rollers 22, 24 and the idle rollers 28a, 28b, 28c in a "W" pattern.

An attempt to simplify the threading process is exemplified in very early pre-stretch roll carriage produced by Lantech. The roll carriage utilized two pre-stretch rollers cantilevered and supported only at the top of the roll carriage, such that the bottoms of the rollers were unsupported and unconnected to any structure. This prior art device utilized an "s" threading pattern around the pre-stretch rollers, which rotated in opposite directions. This roll carriage could be threaded from the bottom without the necessity for additional idle rollers or mechanical split of the roller supports. This design was unsuccessful due to very significant problems in dealing with the forces exerted on the unsupported rollers. The forces caused deformation of the rollers and the mis-alignment of the gears used to maintain relative speeds of the two pre-stretch rollers.

SUMMARY OF THE INVENTION

In accordance with the invention, a film dispenser including a pre-stretch portion for pre-stretching packaging material as it is dispensed is provided. An apparatus for stretch wrapping a load including a film dispenser having a pre-stretch portion for pre-stretching film as it is dispensed also is provided.

According to one aspect of the present invention, a film dispenser for dispensing film during a stretch wrapping operation is provided. The dispenser comprises a roll carriage frame including a drive plate, and a pre-stretch assembly including first and second pre-stretch rollers each having a first end and a second end, wherein the first end of each of said first and second pre-stretch rollers is connected to said drive plate, said second ends of said first and second pre-stretch rollers being connected to one another, and an idle roller positioned between the first and second pre-stretch rollers, an upper end of the idle roller being connected to the roll carriage frame and a second end of the idle roller being unconnected to the roll carriage frame, a space between the idle roller and the pre-stretch rollers forming a film path, the film path being accessible for threading of film from the second ends of the first and second pre-stretch rollers and the unconnected end of the idle roller.

According to another aspect of the present invention, a film dispenser includes a roll carriage frame having a drive plate, and a pre-stretch assembly including first and second pre-stretch rollers, first and second vertical supports, and a bridge portion, wherein upper portions of the first and second pre-stretch rollers are connected to the drive plate and lower ends of the first and second pre-stretch rollers are each connected to the first and second vertical supports, respectively, and wherein the bridge portion connects the vertical supports to one another to connect the first and second pre-stretch rollers to one another.

According to a further aspect of the present invention, a film dispenser comprises a roll carriage frame having a drive plate, and a pre-stretch assembly including first and second pre-stretch rollers, a pivotably mounted, cantilevered idle roller positioned between the first and second pre-stretch rollers, first and second vertical supports, and a bridge portion, wherein upper portions of the first and second pre-stretch rollers are connected to the drive plate and lower ends of the first and second pre-stretch rollers are each connected to the first and second vertical supports, respectively, and wherein the bridge portion connects the vertical supports to one another to connect the first and second pre-stretch rollers to one another, the space between the cantilevered idle roller and the pre-stretch rollers forming a film path, a portion of the cantilevered idle roller movable away from the pre-stretch rollers to permit threading access to the film path.

According to yet another aspect of the present invention, a film dispenser comprises a roll carriage frame having a drive plate, first and second pre-stretch rollers, upper ends of the first and second pre-stretch rollers being connected to the drive plate, and first and second vertical supports, upper ends of the first and second vertical supports being connected to the drive plate and lower ends of the first and second vertical supports being connected to respective lower ends of the first and second pre-stretch rollers.

According to one aspect of the present invention, a film dispenser comprises a roll carriage frame having a drive plate, first and second pre-stretch rollers, upper ends of the first and second pre-stretch rollers being connected to the drive plate, and first and second vertical supports, lower ends of the first and second vertical supports being connected to respective lower ends of the first and second pre-stretch rollers, a bridge portion connecting the first and second vertical supports to one another to connect the first and second pre-stretch rollers, and a flexibly mounted, cantilevered idle roller positioned between the first and second pre-stretch rollers, the cantilevered idle roller configured to be moved into a space formed by the connection between the first and second pre-stretch rollers and urged into contact with one of the first and second pre-stretch rollers by film pre-stretch forces.

According to another aspect of the present invention, a film dispenser includes a roll carriage frame having a drive plate, first and second pre-stretch rollers, upper ends of the first and second pre-stretch rollers being connected to the drive plate, and first and second vertical supports, lower ends of the first and second vertical supports being connected to respective lower ends of the first and second pre-stretch rollers, a bridge portion connecting the first and second vertical supports to one another to connect the first and second pre-stretch rollers, and a flexibly mounted, cantilevered idle roller positioned between the first and second pre-stretch rollers, the cantilevered idle roller configured to be moved into a space formed by the connection between the first and second pre-stretch rollers and to maintain a spaced apart position relative to both the first and second pre-stretch rollers.

According to a further aspect of the present invention, an apparatus for stretch wrapping a load is provided. The apparatus comprises a film dispenser including a roll carriage frame including a drive plate and a pre-stretch assembly including first and second pre-stretch rollers each having a first end and a second end, wherein the first end of each of said first and second pre-stretch rollers is connected to said drive plate, said second ends of said first and second pre-stretch rollers being connected to one another, and an idle roller positioned between the first and second pre-stretch rollers, an upper end of the idle roller being connected to the roll carriage frame and a second end of the idle roller being unconnected to the roll carriage frame, a space between the idle roller and the pre-stretch rollers forming a film path, the film path being accessible for threading of film from the second ends of the first and second pre-stretch rollers and the unconnected end of the idle roller, and means for providing relative rotation between a load and the dispenser to wrap packaging material around the sides of the load.

According to yet another aspect of the present invention, an apparatus for stretch wrapping a load includes a film dispenser including a roll carriage frame having a drive plate and a pre-stretch assembly including first and second pre-stretch rollers, first and second vertical supports, and a bridge portion, wherein upper portions of the first and second pre-stretch rollers are connected to the drive plate and lower ends of the first and second pre-stretch rollers are each connected to the first and second vertical supports, respectively, and wherein the bridge portion connects the vertical supports to one another to connect the first and second pre-stretch rollers to one another, and means for providing relative rotation between a load and the dispenser to wrap packaging material around the sides of the load.

According to one aspect of the present invention, an apparatus for stretch wrapping a load comprises a film dispenser including a roll carriage frame having a drive plate and a pre-stretch assembly including first and second pre-stretch rollers, a pivotably mounted, cantilevered idle roller positioned between the first and second pre-stretch rollers, first and second vertical supports, and a bridge portion, wherein upper portions of the first and second pre-stretch rollers are connected to the drive plate and lower ends of the first and second pre-stretch rollers are each connected to the first and second vertical supports, respectively, and wherein the bridge portion connects the vertical supports to one another to connect the first and second pre-stretch rollers to one another, the space between the cantilevered idle roller and the pre-stretch rollers forming a film path, a portion of the cantilevered idle roller movable away from the pre-stretch rollers to permit threading access to the film path, and means for providing relative rotation between a load and the dispenser to wrap packaging material around the sides of the load.

According to another aspect of the present invention, an apparatus for stretch wrapping a load includes a film dispenser including a roll carriage frame having a drive plate, first and second pre-stretch rollers, upper ends of the first and second pre-stretch rollers being connected to the drive plate, and first and second vertical supports, upper ends of the first and second vertical supports being connected to the drive plate and lower ends of the first and second vertical supports being connected to respective lower ends of the first and second pre-stretch rollers, and means for providing relative rotation between a load and the dispenser to wrap packaging material around the sides of the load.

According to a further aspect of the present invention, an apparatus for stretch wrapping a load comprises a film dispenser including a roll carriage frame having a drive plate, first and second pre-stretch rollers, upper ends of the first and second pre-stretch rollers being connected to the drive plate, and first and second vertical supports, lower ends of the first and second vertical supports being connected to respective lower ends of the first and second pre-stretch rollers, a bridge portion connecting the first and second vertical supports to one another to connect the first and second pre-stretch rollers, and a flexibly mounted, cantilevered idle roller positioned between the first and second pre-stretch rollers, the cantilevered idle roller configured to be moved into a space formed by the connection between the first and second pre-stretch rollers and urged into contact with one of the first and second pre-stretch rollers by film pre-stretch forces, and means for providing relative rotation between a load and the dispenser to wrap packaging material around the sides of the load.

According to yet another aspect of the present invention, an apparatus for stretch wrapping a load comprises a film dispenser including a roll carriage frame having a drive plate, first and second pre-stretch rollers, upper ends of the first and second pre-stretch rollers being connected to the drive plate, and first and second vertical supports, lower ends of the first and second vertical supports being connected to respective lower ends of the first and second pre-stretch rollers, a bridge portion connecting the first and second vertical supports to one another to connect the first and second pre-stretch rollers, and a flexibly mounted, cantilevered idle roller positioned between the first and second pre-stretch rollers, the cantilevered idle roller configured to be moved into a space formed by the connection between the first and second pre-stretch rollers and to maintain a spaced apart position relative to both the first and second pre-stretch rollers, and means for providing relative rotation between a load and the dispenser to wrap packaging material around the sides of the load.

Additional objects and advantages of the invention will be set forth in part in the description that follows, and in part will be obvious from the description, or may be learned by practice of the invention. The objects and advantages of the invention may be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

DESCRIPTION OF THE EMBODIMENTS

Reference will now be made in detail to the present exemplary embodiment of the invention, an example of which is illustrated in the accompanying drawings. Wherever possible, the same reference numbers will be used throughout the drawings to refer to the same or like parts.

In accordance with the present invention, an apparatus is provided for wrapping a load with packaging material. The apparatus includes a packaging material dispenser having a cantilevered pre-stretch assembly configured to pre-stretch the packaging material, and means for providing relative rotation between the load and the dispenser to wrap packaging material around the load.

Figure 2A:
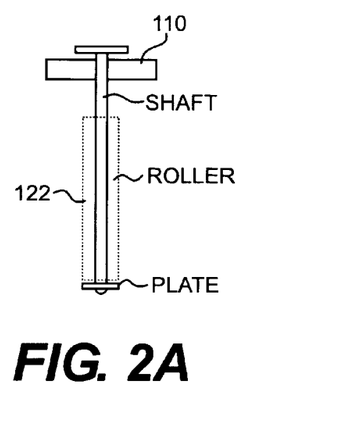
FIG. 2A is a side view of an embodiment of a cantilevered pre-stretch roller according to the present invention.
Figure 2B:
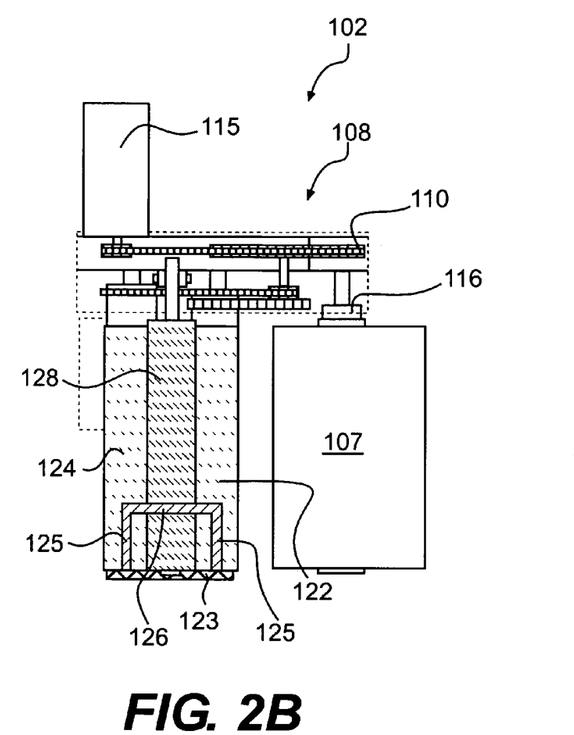
FIG. 2B is a front view of a film dispenser including an embodiment of a cantilevered pre-stretch assembly, according to the present invention.
Figure 2C:
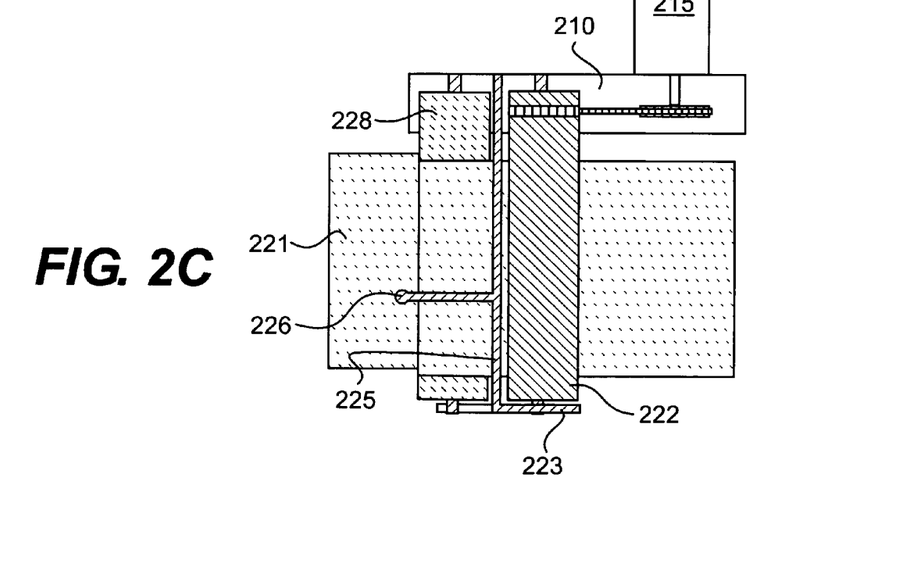
FIG. 2C is a side view of a film dispenser with an alternative embodiment of a cantilevered pre-stretch assembly, according to the present invention.
Figure 5:
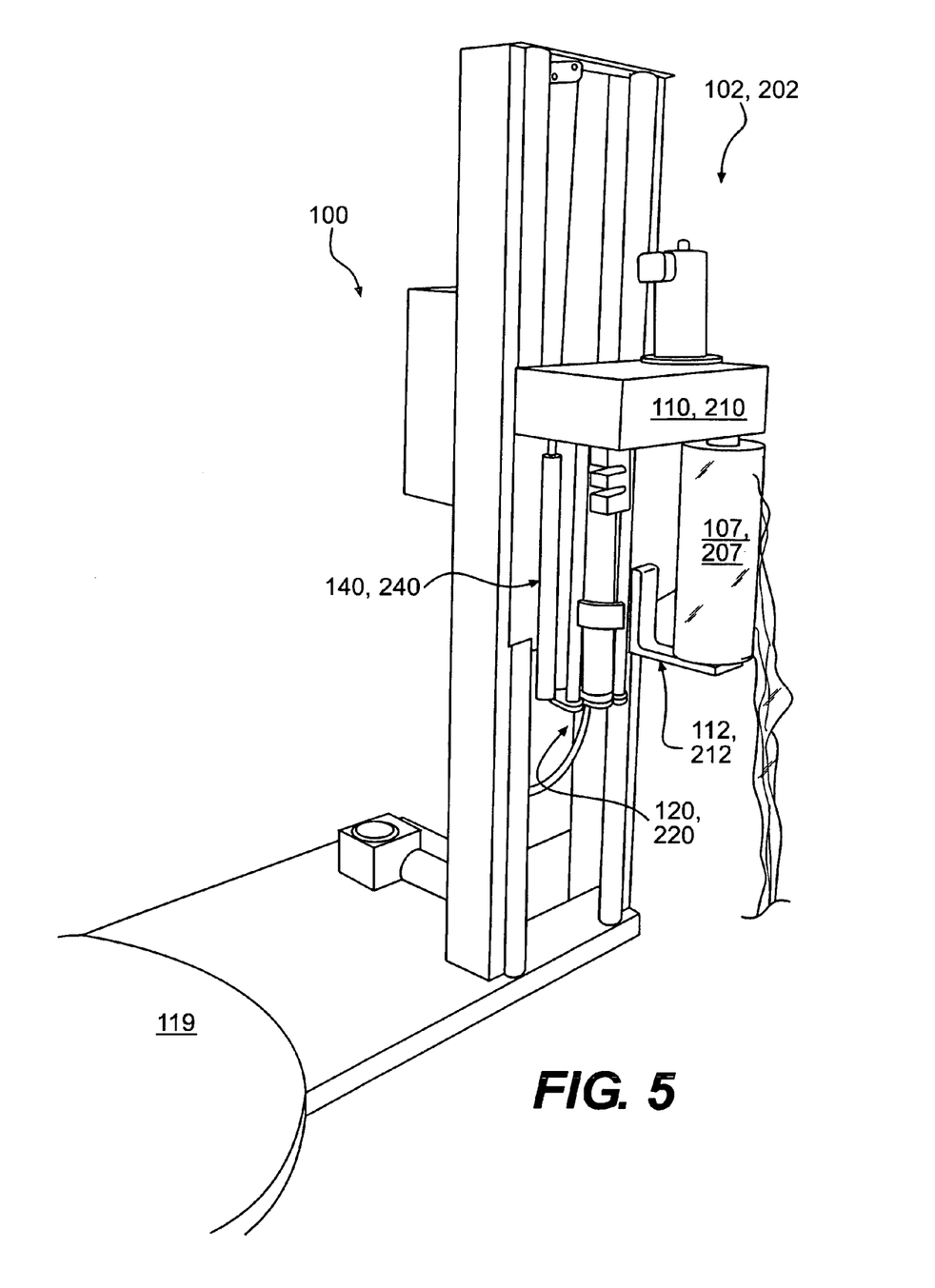
FIG. 5 is an isometric view of a stretch wrapping apparatus having a film dispenser mounted on a mast, according to the present invention.
Figure 6:
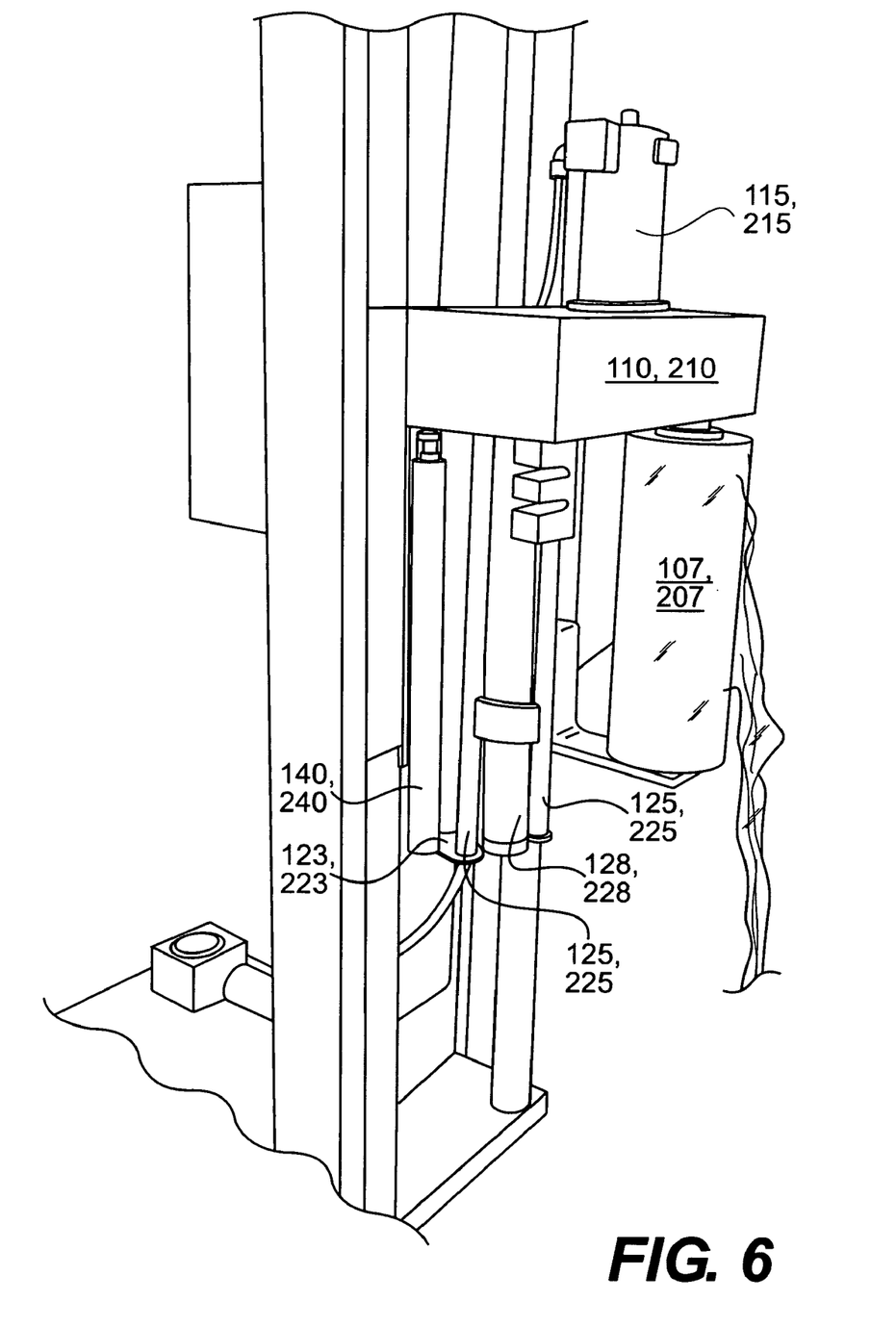
FIG. 6 is an isometric view of the film dispenser of the apparatus of FIG. 5, according to the present invention.
Figure 11:
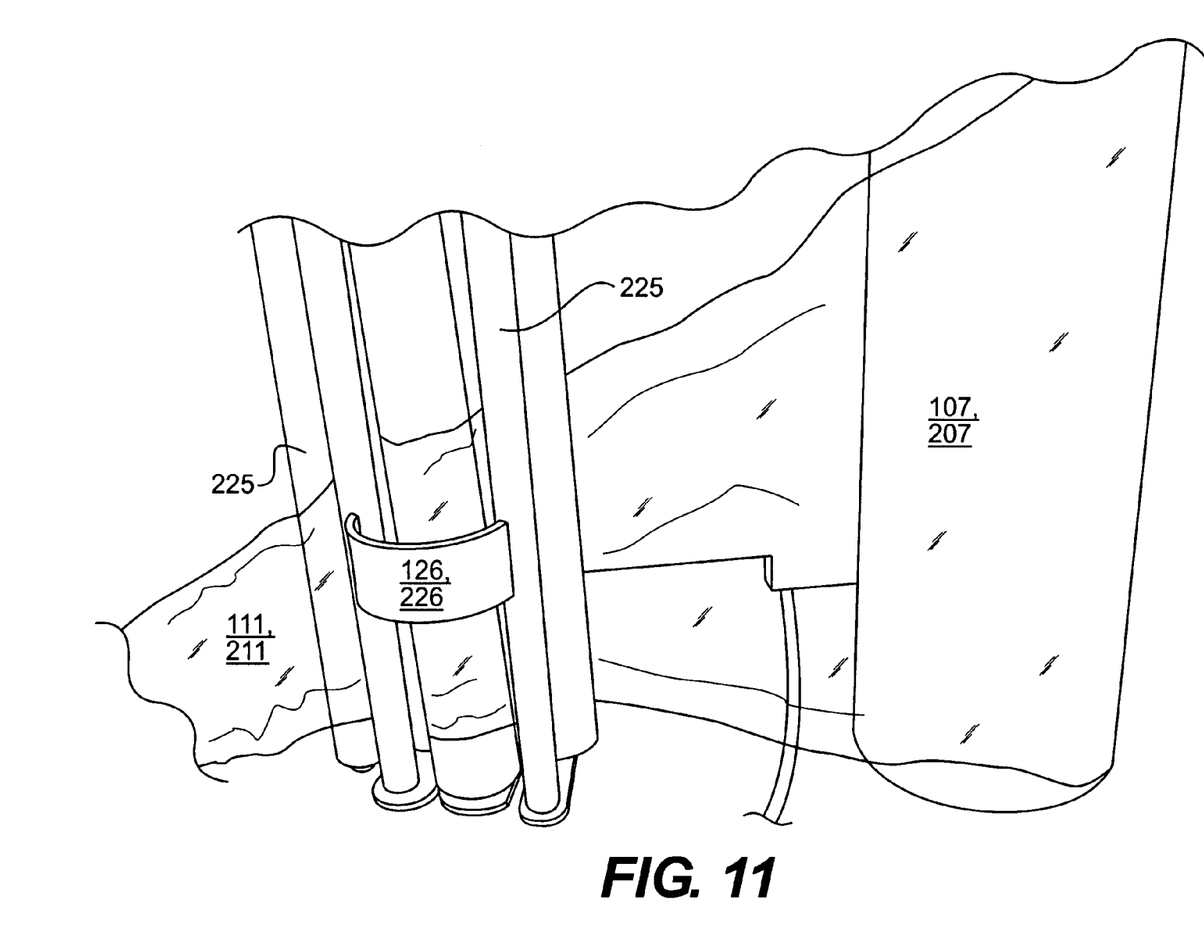

As embodied herein and shown in FIGS. 2B, 2C, 5, 6, and 11, an apparatus 100 includes a packaging material dispenser 102. As shown in FIG. 11, packaging material dispenser 102 dispenses a sheet of packaging material 111 in a web form. As shown in FIGS. 2B, 2C, and 5, packaging material dispenser 102 has a roll carriage frame 108, 208. As embodied herein and show in FIGS. 2B, 2C, 5 and 6, roll carriage frame 108, 208 includes an upper frame portion or roll carriage drive plate 110, 210 and may include a film support portion 112, 212. As shown in FIGS. 5 and 6, a drive motor 115, 215 may be supported on an upper surface of roll carriage drive plate 110, 210.

Dispenser 102 contains a roll of packaging material 107 to be dispensed. A film unwind stand 116 is mounted to roll carriage drive plate 110 of the roll carriage frame 108 and extends downwardly from roll carriage drive plate 110. The film unwind stand 116 is constructed to support a roll of film 107 as the packaging material unwinds, moving from the roll of film 107 to a pre-stretch assembly to be described below. The film unwind stand 116 may be bottom-loaded, such that the roll of film 107 may be loaded into the dispenser 102 from below the dispenser 102. A film support portion 112 of roll carriage frame 108 may be provided to support the bottom end of the film unwind stand 116. This film support portion 112, if provided, may be hinged or rotatably mounted to permit the loading and unloading of the roll of film 107. Alternatively, a bottom portion of film unwind stand 116 includes, for example, a swing latch to allow a core of the film roll 107 to pass onto the stand 107 and then hold the film roll 107 in place.

According to one aspect of the invention, means for providing relative rotation between a load and the dispenser is provided. The means for providing relative rotation may include, for example, a rotatable turntable 119 (see FIG. 5). Packaging material dispenser 102 may be mounted on a stationary mast 103 upon which roll carriage frame 108 can be vertically driven and positioned to dispense packaging material 111 from dispenser 102 to wrap the load as the load rotates on the turntable. Alternatively, roll carriage frame 108 may be vertically moveable on an arm (not shown) to dispense packaging material 111 spirally about a load as the arm rotates about the load or dispenser 102 may be mounted on a wrapping ring (not shown) to dispense packaging material 111 spirally about load as dispenser 102 rotates around the ring and the load.

In an exemplary embodiment, stretch wrap packaging material is used, however, various other packaging materials such as netting, strapping, banding, or tape can be used as well. As used herein, the terms "packaging material," "film," "web," and "film web" are interchangeable.

As embodied in FIGS. 2B, 2C, and 5, the dispenser 102 includes a cantilevered pre-stretch assembly 120. "Cantilevered" as used in this application with regard to the pre-stretch assembly, is intended to convey that only the roll carriage drive plate 110 supports the pre-stretch assembly. That is, unlike conventional roll carriage frames, there is not a bottom or side frame portion of the roll carriage frame 108 that also supports the pre-stretch assembly. This cantilevered design provides improved access to the pre-stretch assembly and easier threading of the pre-stretch rollers with the packaging material at minimal cost and without complex roll carriage design. "Cantilevered" as used in this application with regard to the idle roller, is intended to convey that only a single end of the roller is connected to or supported by structure.

As shown in FIG. 2B, cantilevered pre-stretch assembly 120 includes a first upstream pre-stretch roller 122 and a second downstream pre-stretch roller 124. "Upstream" and "downstream," as used in this application, are intended to define the direction of movement relative to the flow of packaging material 111 from the dispenser 102. Thus, since the packaging material 111 flows from the dispenser 102, movement toward the dispenser 102 and against the flow of packaging material 111 from the dispenser 102 is defined as "upstream" and movement away from the dispenser 102 and with the flow of packaging material 111 from the dispenser 102 is defined as "downstream." The pre-stretch rollers may be connected to a power source, however, they do not need to be and the rollers therefore may be powered or unpowered.

As embodied herein and shown in FIG. 2A, each pre-stretch roller 122, 124 is preferably the same size, and each may have, for example, an outer diameter of approximately 2.5 inches. Each roller should have a sufficient length to carry a twenty (20) inch wide web of film 111 along its working length. In one exemplary embodiment, rollers used for conventional conveyors were used to form the pre-stretch rollers 122, 124. Each roller 122, 124 is mounted on a shaft, for example, a hex shaft. In one embodiment, bearings for supporting a shaft, such as a hex shaft, are press-fit or welded into each end of the roller, and the shaft is placed therethrough, such that the shaft is centrally and axially mounted through the length of the roller. A sprocket may be mounted/attached to an outer surface of each roller. The rollers are thus connected to each other through chains to a sprocket idle shaft with the pre-stretch sprockets selected for the desired pre-stretch level. Within the dispenser 102, the sprocket may be connected to a drive motor 115 and is also mounted to the same idle shaft (see FIG. 2B). The cantilevered pre-stretch assembly 120 maintains the surface speed of the downstream pre-stretch roller 124 at a speed which is faster than the speed of the upstream pre-stretch roller 122 to stretch the stretch wrap packaging material between the pre-stretch rollers 122 and 124.

A first end of each of first and second pre-stretch rollers 122, 124 is connected to and extends downwardly from roll carriage drive plate 110 of dispenser 102. The second ends of the first and second pre-stretch rollers 122, 124 each have a base or bottom most portion. The bases of the pre-stretch rollers 122, 124 may be of the same diameter as the remainder of the roller. Alternatively, the rollers 122, 124 may be tapered at their bases into a cone-like shape. This may be accomplished by, for example, connecting washers or other cylindrical shaped elements of a diameter smaller than the roller to the base of the roller, to create a tapered shape. Preferably, such additional elements do not rotate with the rollers but are fixed. The tapered or cone-like shape at the base of the rollers helps to eliminate snagging the film during the threading process. The bottom most portion of each pre-stretch roller 122, 124 may include a plate 123. Each plate 123 is connected to a vertical support 125. Vertical supports 125 are connected to each other via a bridge portion 126. Bridge portion 126 thus connects the first and second pre-stretch rollers 122, 124 to one another to maintain their alignment against the high forces generated during pre-stretching of the packaging material. The connection of the rollers 122, 124 is designed to permit easy threading of the film fully around the pre-stretch rollers 122, 124, and the idle roller discussed below.

In one embodiment, the second end of each of first and second pre-stretch rollers 122, 124 is not directly connected to or supported by roll carriage frame 108. That is, as shown in FIG. 2B, vertical supports 125 may not extend back up to roll carriage drive plate 110 of roll carriage frame 108. Alternatively, as shown in FIG. 2C, vertical supports 225 may extend up to roll carriage drive plate 210 to provide additional support to the cantilevered pre-stretch assembly 220. In such an embodiment, the rollers 222, 224 are connected by bridge portion 226 as described previously.

Regardless of whether the vertical supports 125, 225 extend back to roll carriage drive plate 110, 210, the bridge portion 126, 226 connects the vertical supports 125, 225 to one another at a point above the base or bottom-most portions of the rollers. Providing the connection between the rollers at a point above the base/bottom-most portion of the rollers 122, 124, 222, 224 permits the threading of the rollers with the film 111, 211 at the base or bottom-most portion of the rollers 122, 124, 222, 224.

In an alternative embodiment, vertical supports 125 may extend back to the roll carriage drive plate 110 but remain unconnected to one another. In such an embodiment, the connection of the base of each pre-stretch roller 122, 124 back to the roll carriage drive plate 110 should provide sufficient support for the pre-stretch rollers to maintain their alignment against the high forces generated during pre-stretching of the packaging material. Such a configuration also would permit easy threading of the film fully around the pre-stretch rollers 122, 124, and the idle roller 128.

Figure 3A:
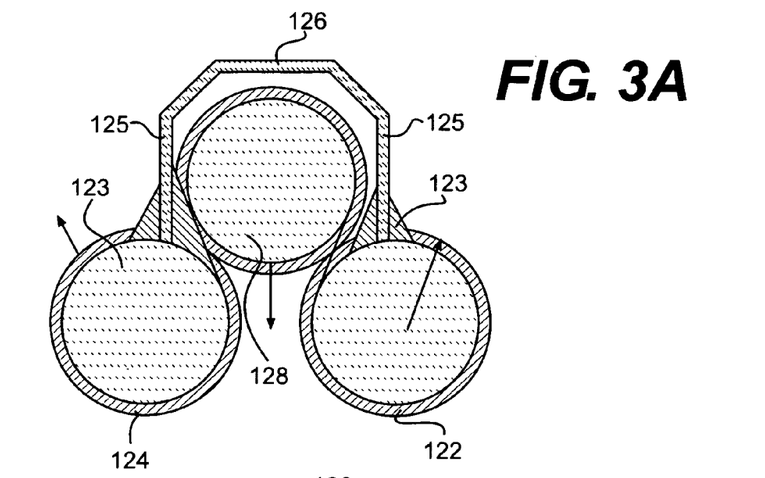
FIG. 3A is a bottom view of a first embodiment of the film dispenser of FIG. 2B, according to one aspect of the present invention, the film dispenser having cantilevered pre-stretch rollers and a pinch idle roller.
Figure 3B:
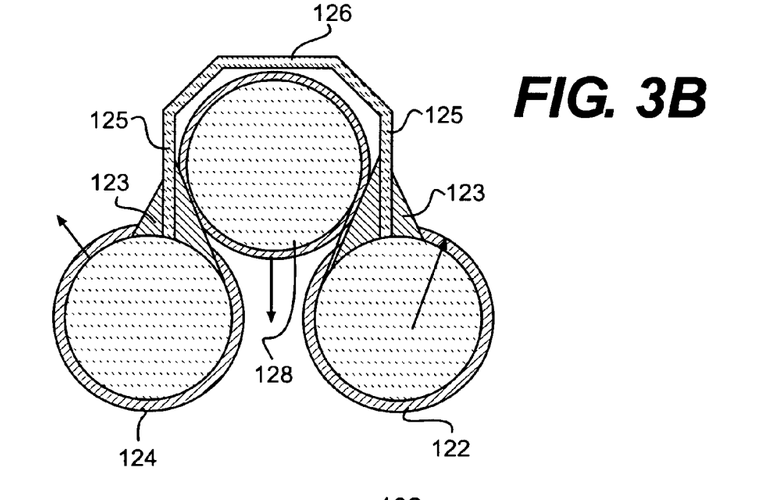
FIG. 3B is a bottom view of an alternative embodiment of the film dispenser of FIG. 2B, according to one aspect of the present invention, the film dispenser having cantilevered pre-stretch rollers and a spaced apart idle roller.
Figure 4:
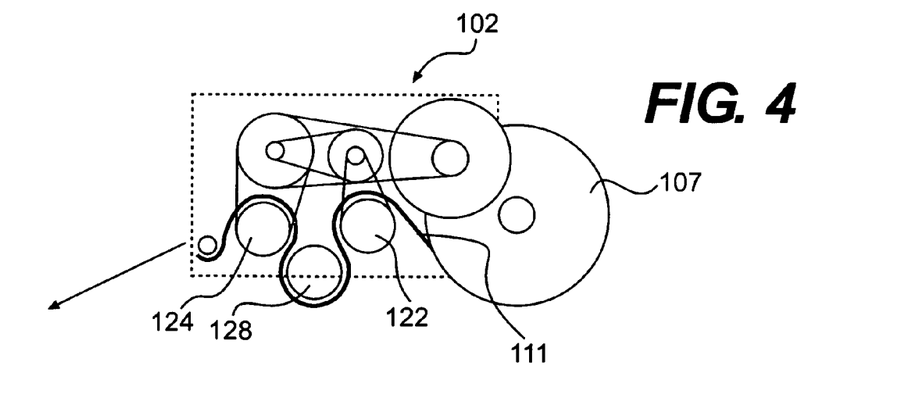
FIG. 4 is a top cross-sectional view of the film dispenser of FIG. 2B, according to the present invention.

As shown in FIGS. 3A and 3B, the vertical supports 125 may extend outward from plates 123 and then upward to connect with bridge 126, forming a substantially U-shaped guard in front of an idle roller 128. The shape of the connection between the first and second pre-stretch rollers 122, 124 may be used to control the position of the idle roller 128, as discussed below.

As embodied herein and shown in FIGS. 2A-4 and 7, cantilevered pre-stretch assembly 120 includes an intermediate idle roller 128 positionable between the upstream and downstream pre-stretch rollers 122 and 124. The intermediate idle roller 128 may be the same diameter as or smaller in diameter than the pre-stretch rollers. Preferably, intermediate idle roller 128 is uncoated. As with the pre-stretch rollers 122, 124, the intermediate idle roller 128 should have a sufficient length to carry a twenty (20) inch wide web of film along its working length. Intermediate idle roller 128 is an idler roller hingedly connected to the upper frame portion 110 of roller carriage frame 108. Intermediate idle roller 128 is also a cantilevered roller and it may not be connected to an additional structure and is not supported at its base. Although not physically connected at its base or to a base support, as shown in FIGS. 3A and 3B, intermediate idle roller 128 may nest in the U-shaped guard 130 that connects the first and second pre-stretch rollers 122, 124.

A film path is defined by the space between the pre-stretch rollers 122, 124 and the intermediate idle roller 128. The film path is easily accessible via the bottom or lower end of the cantilevered pre-stretch assembly 120, as shown in FIGS. 8A, 8B, 9, and 10. As shown in these figures, a rope of film 111 is pulled from roll of film 107, behind upstream pre-stretch roller 122, around and between upstream pre-stretch roller 122 and intermediate idle roller 128, around intermediate idle roller 128, in between idle roller 128 and downstream pre-stretch roller 124, around downstream pre-stretch roller 124, and to the load, or, if present, between downstream pre-stretch roller 124 and a second idle roller (discussed below) and then to the load.

Figure 7:
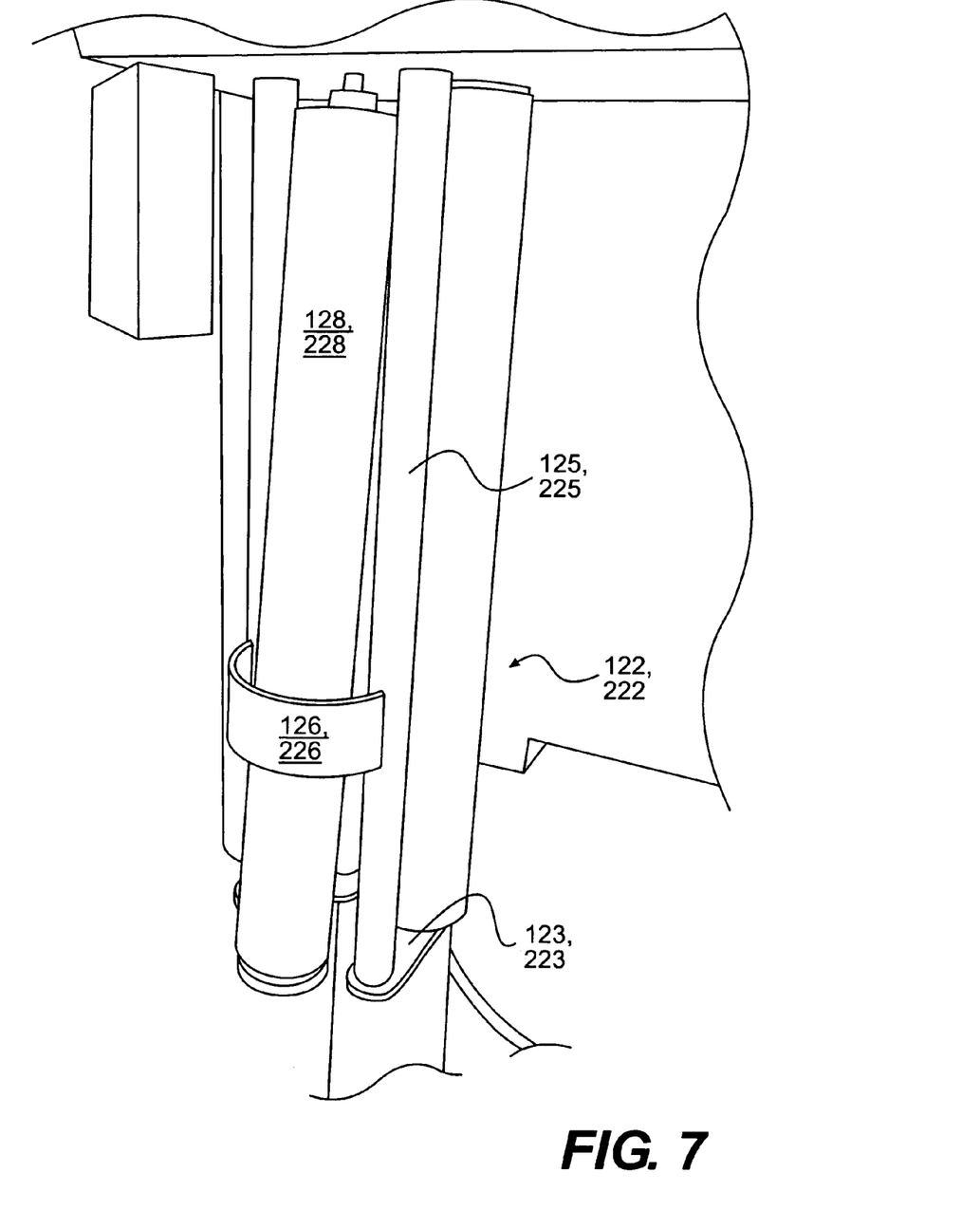
FIG. 7 is an isometric view of a cantilevered pre-stretch assembly of the film dispenser the apparatus of FIG. 5.
Figure 8A:
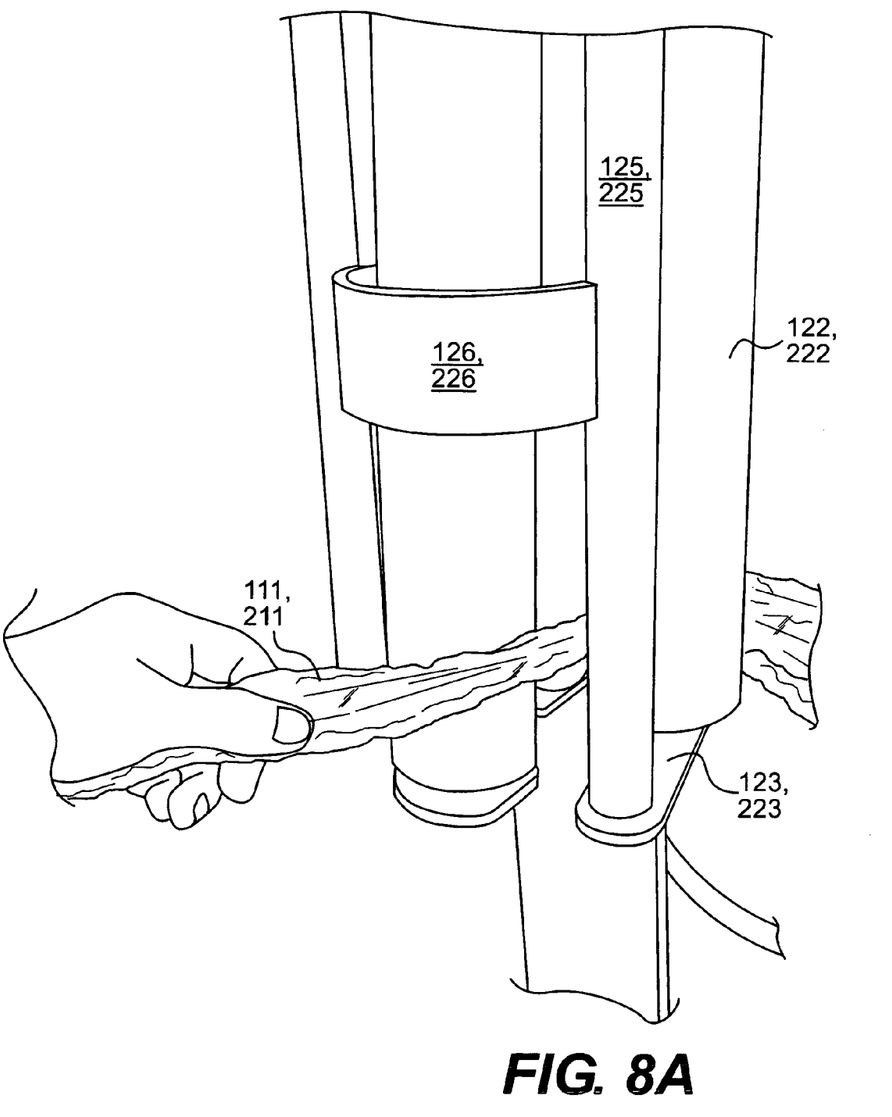
FIGS. 8A, 8B, and 9-11 are sequential isometric views of the cantilevered pre-stretch assembly and film dispenser of FIGS. 5-6, illustrating the process of threading packaging material through the cantilevered pre-stretch assembly of the film dispenser.
Figure 8B:
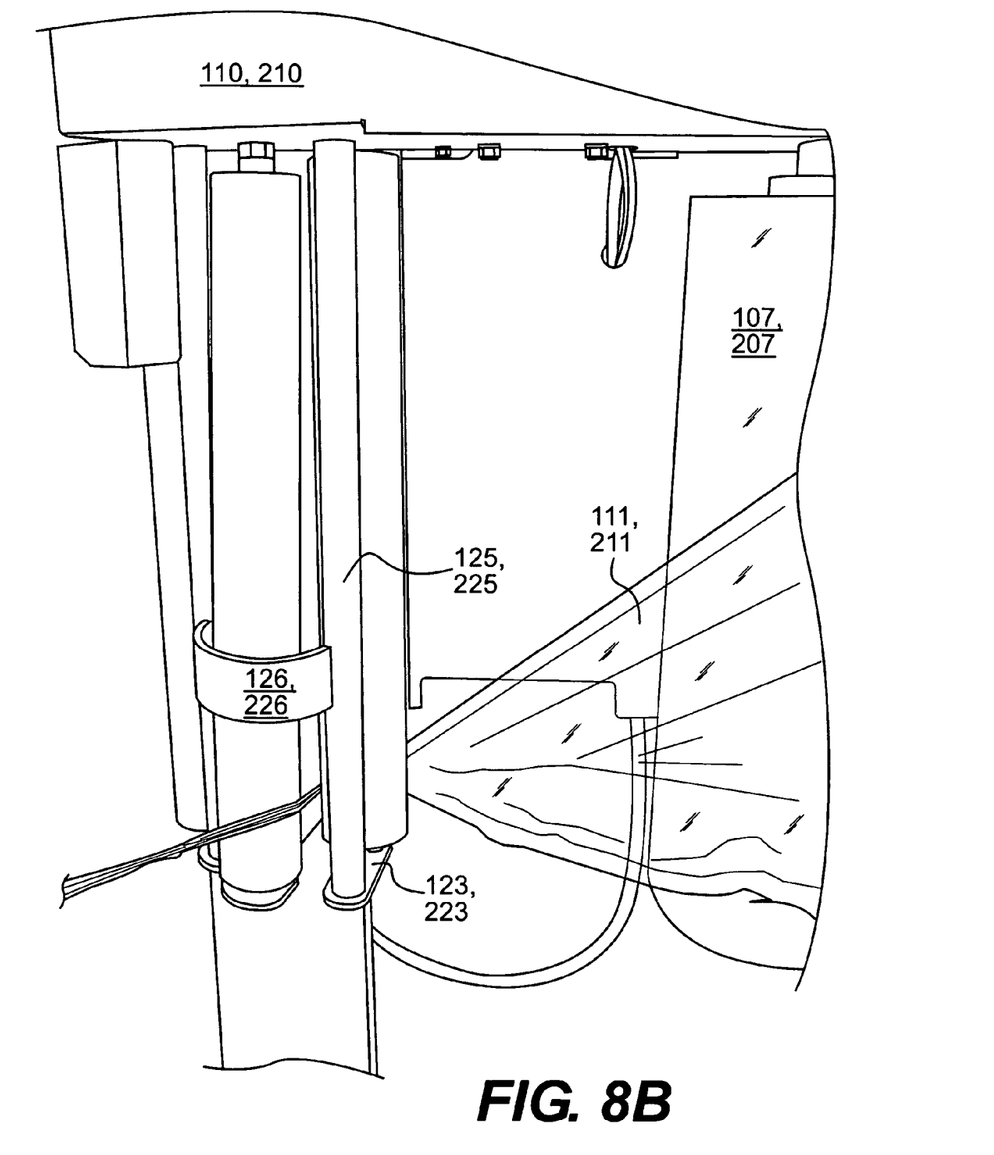
Figure 9:
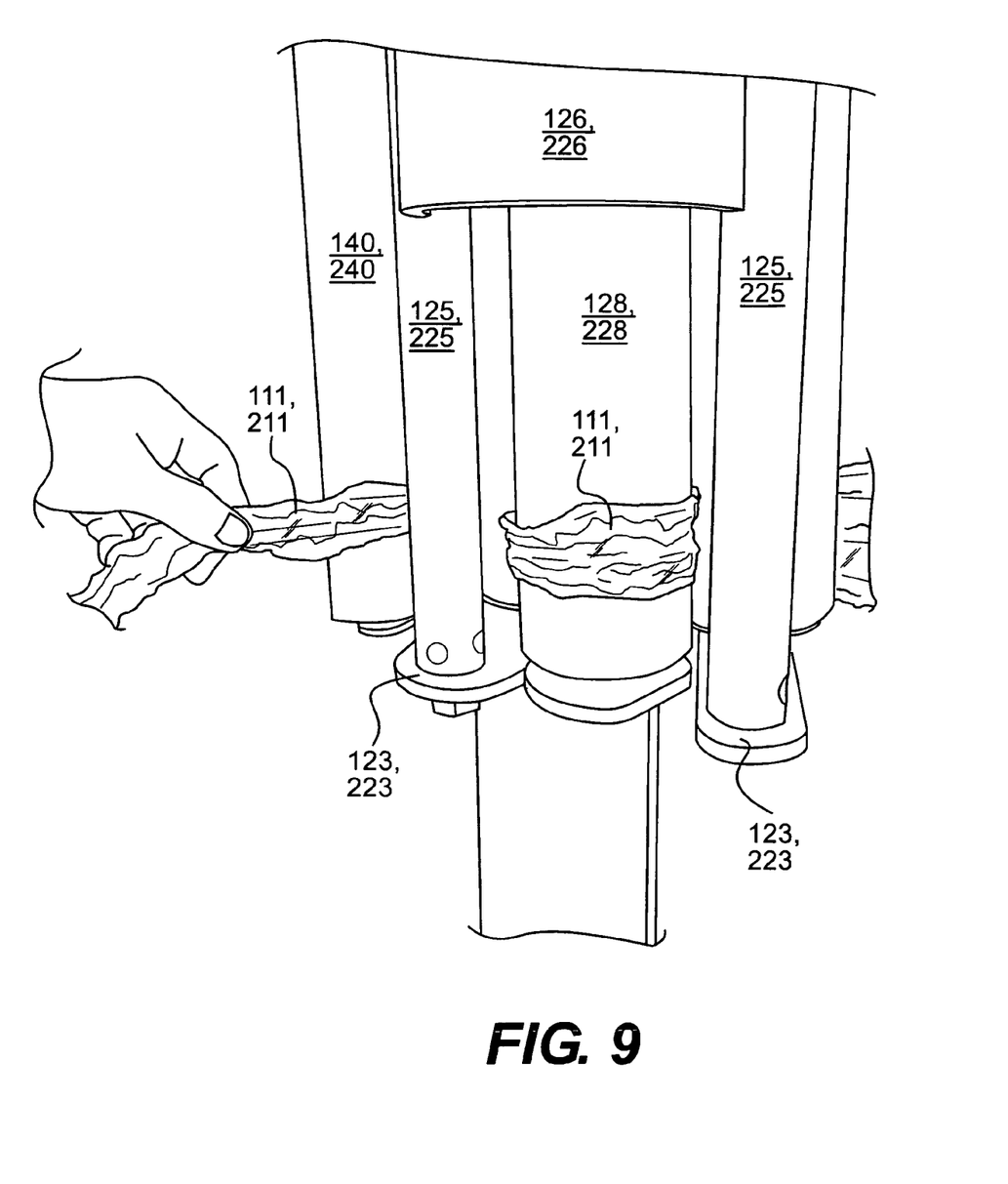
Figure 10:
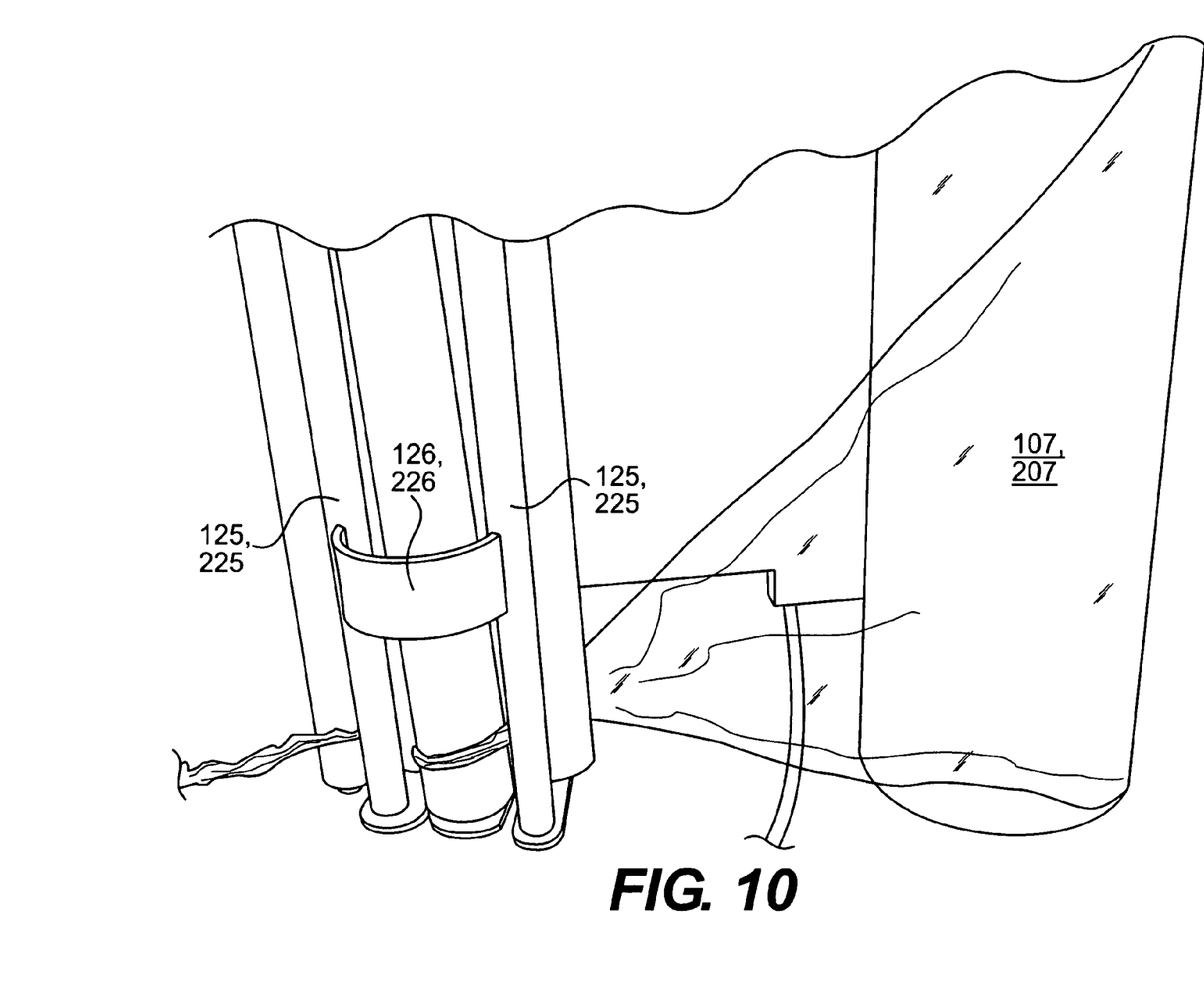

As shown in FIG. 6, intermediate idle roller 128 is mounted in between upstream and downstream pre-stretch rollers 122, 124 and is movable outward, away from upstream and downstream pre-stretch rollers 122, 124. Movement of intermediate idle roller 128 away from the pre-stretch rollers, as shown in FIG. 7, provides access to the space between the pre-stretch rollers (see FIGS. 8A, 8B, and 9) to permit threading of the packaging material 111 around the pre-stretch rollers 122, 124. The cantilevered and hinged idle roller 128 is mounted for optimum film wrap around the pre-stretch rollers 122, 124. Preferably the intermediate idle roller 128 is aligned to provide a pinching action on the upstream roller as disclosed in U.S. Pat. No. 5,414,979, the entire disclosure of which is incorporated herein by reference.

As embodied herein and shown in FIGS. 2B, 2C, 3A, and 3B, the intermediate idle roller 128 is hinged at the top and the base shaft rides in a alignment slot formed between the pre-stretch rollers 122, 124. It should be noted that there are no forces on the cantilevered roller shaft since it is pulled into engagement with the upstream pre-stretch roller along its full length. The hinged intermediate idle roller 128 may be preloaded to an open position with a compression spring so that it easily permits film threading. The hinged connection may include, for example, an angled slot to permit the intermediate idle roller 128 to completely disengage for safety reasons if a hand or finger was caught.

According to the present invention, the intermediate idle roller 128 may be positioned between the upstream and downstream pre-stretch rollers 122, 124, abutting one of the upstream and downstream pre-stretch rollers, and spaced from the other of the upstream and downstream pre-stretch rollers. Intermediate idle roller 128 is pivoted to allow it to ride along the surface of one of the upstream and downstream pre-stretch rollers. In doing so, intermediate idle roller 128 is positioned so that it is abutting upstream pre-stretch roller 122 and spaced from downstream pre-stretch roller 124 (see FIG. 3A). This reduces the amount of unsupported film by 100%. Reducing the amount of unsupported film, reduces the amount of neckdown in the width dimension of the film. This generates a greater area stretch of the film. In this embodiment, the inventors have noticed an almost complete elimination of film slippage on the upstream pre-stretch roller.

The intermediate idle roller 128 may be biased against the pre-stretch roller which it is abutting, for example, against upstream pre-stretch roller 122. The pivotable/hinged mounting of the intermediate idle roller 128 permits the stretch wrap packaging material 111 to bias the intermediate idle roller 128 against the upstream pre-stretch roller 122. This is achieved through the force vector resulting from the geometry of the mountings and force application by the packaging material 111. Alternatively, the biasing may be achieved through the use of a spring or similar element.

The result of this arrangement is that the intermediate idle roller 128 is abutting upstream pre-stretch roller 128 during operation such that the upstream pre-stretch roller 122 and the intermediate idle roller 128 are separated by the thickness of the film and rotate at generally identical surface speeds. Intermediate idle roller 128 effectively acts like a pinch roller or press roller in relation to the roller it abuts. As a pinch roller or press roller, intermediate idle roller 128 effectively acts as an extension of the pre-stretch roller 122 which it abuts by offering increased surface for the traction to the film. In doing so, the intermediate idle roller 128 pinches the film between itself and the pre-stretch roller which it abuts to offer greater traction. Increased traction of the pre-stretch rollers reduces the damage to the film in the machine direction by decreasing the abrasion of the film. While the intermediate idle roller 128 is shown abutting the upstream pre-stretch roller 122, it is possible for the intermediate idle roller 128 to instead abut the downstream pre-stretch roller 124.

In an alternative arrangement, shown in FIG. 3B, intermediate idle roller 128 may be proximate to but spaced from both the upstream and downstream pre-stretch rollers 122, 124. In such an embodiment, the intermediate idle roller 128 is positioned so that there are two gaps between the idle roller 128 and the pre-stretch rollers 122, 124. In contrast, when the intermediate idle roller abuts the upstream pre-stretch roller 122, there is only one gap between the idle roller 128 and the pre-stretch rollers.

When the intermediate idle roller 128 is in the operating position shown in FIG. 5, it is proximate to both the upstream and downstream pre-stretch rollers 122 and 124 for carrying the stretch wrap packaging material 111 between the upstream and downstream pre-stretch rollers and preventing neckdown of the stretch wrap packaging material 111 being stretched between the upstream and downstream pre-stretch rollers 122 and 124.

According to one aspect of the present invention, the cantilevered pre-stretch assembly 120 may include a second idle roller 140. As embodied herein and shown in FIGS. 5 and 6, second idle roller 140 may be mounted as a "dancer" and may be used to sense any film breaks. The second idle roller 140 is positioned downstream of the downstream pre-stretch roller 124. As shown in FIGS. 5 and 6, an upper end of the second idle roller 140 is connected to the upper frame portion 110 and extends downwardly from there. Although shown as a cantilevered roller, it is not necessary that this roller be cantilevered. The force of the film as it passes over the second idle roller 140, may, for example, bias it away from a proximity switch, such that a break in the film would cause the idle roller 140 to move away toward the switch and thereby cause the motor power to be turned off.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A film dispenser for dispensing film during a stretch wrapping operation, the dispenser comprising:
    a roll carriage frame having a drive plate;
    first and second pre-stretch rollers, first ends of the first and second pre-stretch rollers being connected to the drive plate; and
    first and second vertical supports connected by a bridge portion, one of first and second ends of the first and second vertical supports being connected to second ends of the first and second pre-stretch rollers.

2. The film dispenser of claim 1, further comprising an idle roller positioned at least partially between the first and second pre-stretch rollers.

3. The film dispenser of claim 2, wherein a first end of the idle roller is connected to the roll carriage frame.

4. The film dispenser of claim 3, wherein a second end of the idle roller is unconnected to the roll carriage frame.

5. The film dispenser of claim 2, further comprising a space between the idle roller and the pre-stretch rollers forming a film path, the film path being accessible for threading of film from the second ends of the first and second pre-stretch rollers and an end of the idle roller.

6. The film dispenser of claim 2, wherein the idle roller is a cantilevered roller and is flexibly connected to the drive plate.

7. The film dispenser of claim 6, wherein at least a portion of the idle roller is movable away from the pre-stretch rollers to permit threading access to the film path.

8. The film dispenser of claim 6, wherein the idle roller is configured to be urged into contact with one of the first and second pre-stretch rollers by film pre-stretch forces.

9. The film dispenser of claim 6, wherein the idle roller is configured to be moved into a space formed by the connection between the first and second pre-stretch rollers and to maintain a spaced apart position relative to both the first and second pre-stretch rollers.

10. The film dispenser of claim 1, wherein the bridge portion connects central portions of the first and second vertical supports.

11. The film dispenser of claim 1, wherein the bridge portion connects the other of the first and second ends of the first and second vertical supports.

12. A film dispenser for dispensing film during a stretch wrapping operation, the dispenser comprising:
    a roll carriage frame including a drive plate; and
    a pre-stretch assembly including first and second pre-stretch rollers each having a first end and a second end, wherein the first end of each of said first and second pre-stretch rollers is connected to said drive plate, said second ends of said first and second pre-stretch rollers being connected to one another, and an idle roller positioned between the first and second pre-stretch rollers, a first end of the idle roller being connected to the roll carriage frame and a second end of the idle roller being unconnected to the roll carriage frame, a space between the idle roller and the pre-stretch rollers forming a film path, the film path being accessible for threading of film from the second ends of the first and second pre-stretch rollers and the unconnected end of the idle roller.

13. A film dispenser for dispensing film during a stretch wrapping operation, the dispenser comprising:
    a roll carriage frame having a drive plate; and
    a pre-stretch assembly including first and second pre-stretch rollers, first and second vertical supports, and a bridge portion, wherein first portions of the first and second pre-stretch rollers are connected to the drive plate and second portions of the first and second pre-stretch rollers are each connected to the first and second vertical supports, respectively, and wherein the bridge portion connects the vertical supports to one another to connect the first and second pre-stretch rollers to one another.

14. The film dispenser of claim 13, wherein the bridge portion connects central portions of the first and second vertical supports.

15. The film dispenser of claim 13, wherein the bridge portion connects end portions of the first and second vertical supports.

16. A film dispenser for dispensing film during a stretch wrapping operation, the dispenser comprising:
    a roll carriage frame having a drive plate; and
    a pre-stretch assembly including first and second pre-stretch rollers, a pivotably mounted, cantilevered idle roller positioned between the first and second pre-stretch rollers, first and second vertical supports, and a bridge portion, wherein first portions of the first and second pre-stretch rollers are connected to the drive plate and second portions of the first and second pre-stretch rollers are each connected to the first and second vertical supports, respectively, and wherein the bridge portion connects the vertical supports to one another to connect the first and second pre-stretch rollers to one another, the space between the cantilevered idle roller and the pre-stretch rollers forming a film path, a portion of the cantilevered idle roller movable away from the pre-stretch rollers to permit threading access to the film path.

17. The film dispenser of claim 16, wherein the bridge portion connects central portions of the first and second vertical supports.

18. The film dispenser of claim 16, wherein the bridge portion connects end portions of the first and second vertical supports.

19. A film dispenser for dispensing film during a stretch wrapping operation, the dispenser comprising:
    a roll carriage frame having a drive plate;
    first and second pre-stretch rollers, first ends of the first and second pre-stretch rollers being connected to the drive plate; and
    first and second vertical supports, one of first and second ends of the first and second vertical supports being connected to respective second ends of the first and second pre-stretch rollers;
    a bridge portion connecting the first and second vertical supports to one another to connect the first and second pre-stretch rollers; and
    a flexibly mounted, cantilevered idle roller positioned between the first and second pre-stretch rollers, the cantilevered idle roller configured to be moved into a space formed by the connection between the first and second pre-stretch rollers and urged into contact with one of the first and second pre-stretch rollers by film pre-stretch forces.

20. The film dispenser of claim 19, wherein the bridge portion connects central portions of the first and second vertical supports.

21. The film dispenser of claim 19, wherein the bridge portion connects the other of the first and second ends of the first and second vertical supports.

22. A film dispenser for dispensing film during a stretch wrapping operation, the dispenser comprising:
    a roll carriage frame having a drive plate;
    first and second pre-stretch rollers, first ends of the first and second pre-stretch rollers being connected to the drive plate; and
    first and second vertical supports, one of first and second ends of the first and second vertical supports being connected to respective second ends of the first and second pre-stretch rollers;
    a bridge portion connecting the first and second vertical supports to one another to connect the first and second pre-stretch rollers; and
    a flexibly mounted, cantilevered idle roller positioned between the first and second pre-stretch rollers, the cantilevered idle roller configured to be moved into a space formed by the connection between the first and second pre-stretch rollers and to maintain a spaced apart position relative to both the first and second pre-stretch rollers.

23. The film dispenser of claim 22, wherein the bridge portion connects central portions of the first and second vertical supports.

24. The film dispenser of claim 22, wherein the bridge portion connects the other of the first and second ends of the first and second vertical supports.

* * * * *